Sept. 20, 1955 J. V. CRAWFORD ET AL Re. 24,061

ANCHOR

Original Filed Dec. 13, 1947

JAMES V. CRAWFORD,
RAYMOND W. JENSEN,
INVENTORS.

BY John H. Wallace

United States Patent Office

Re. 24,061
Reissued Sept. 20, 1955

24,061

ANCHOR

James V. Crawford and Raymond W. Jensen, Los Angeles, Calif., assignors to The Garrett Corporation, Los Angeles, Calif., a corporation of California Original No. 2,593,111, dated April 15, 1952, Serial No. 791,554, December 13, 1947. Application for reissue September 13, 1952, Serial No. 309,572

8 Claims. (Cl. 114—207)

Matter enclosed in heavy brackets [ ] appears in the original patent but forms no part of this reissue specification; matter printed in italics indicates the additions made by reissue.

Our invention relates to marine anchors. More particularly it relates to marine anchors of the so-called light-weight, folding type. Anchors of the general type of that of the present invention are disclosed in the patent to Northrop and Gesner, Reissue 21,841, dated June 24, 1941.

One problem encountered in the use of light-weight boat anchors by owners of small craft or seaplanes is that of aboardship stowage and handling posed by the peculiarly awkward shape of these anchors. An anchor of this type has a shank, and a stock at the crown or bottom end of the shank at right angles thereto. A fluke arm with its flukes is disposed at the bottom of the shank, but in a plane at right angles to the plane of the shank and stock. The result is an object which by its very intent and purpose is so shaped that it will not lie flat against a boat deck or in a locker, unless it can be folded. The aforementioned patent discloses a folding anchor, but the construction taught is regarded as being relatively complex.

Accordingly, it is an object of our invention to provide an anchor of the aforementioned type which can be folded and which is of simple construction.

We obtain our objective by securing the shank and stock in fixedly assembled relationship and by detachably securing thereto a unitary arm-and-fluke member. By the operation of a simple latch the fluke arm member may be released from secured engagement with the stock and shank. It may then be slid up the shank to a point where it may be swung through ninety degrees, until it lies in the plane of the shank and stock, whereupon it may be slid down the shank and relatched in stowing position.

It is a further object to provide a cooperative sliding and rotating relationship between the fluke arm and the shank, whereby the various parts of the anchor are not separated from each other during any part of the operation of changing the anchor from working to stowing positions or vice versa, thereby eliminating any possibility of lost pins, bolts, etc.

Further objects will be apparent upon an inspection of the accompanying drawings when considered with the following description and the appended claims.

Referring to the drawings, wherein like reference numerals indicate like parts throughout:

Figure 4:
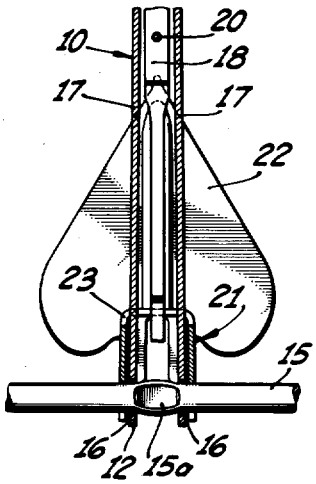
Figure 4 is a partially cross-sectional fragmental view taken on the line 4—4 of Figure 3.

The anchor is shown as having a shank 10, of a generally square-channeled cross-section and tapering symmetrically from its smallest cross-sectional dimensions at the free end 11 to its largest cross-sectional dimensions at the crown end 12. The free end of the shank has a hole 13 to receive a ring 14 for the purpose of attaching an anchor cable (not shown). The crown end of the shank receives the stock *member* [*arm*] 15 through apertures 16 in the shank sides 17, as best shown in Figure 4. The central portion of the stock which lies between the sides of the shank is flattened at 15a to secure it against end-wise movement within the apertures. Disposed within the channel of the shank is a latch 18, preferably made from a strip of spring steel bent to shape as shown and secured to the web 19 of the shank by means of rivets 20.

Slidably disposed on the shank 10 is a fluke arm *member* 21, generally channel shaped in cross-section, having flukes 22 of suitable size and shape, integral therewith and disposed substantially in spaced symmetrical relationship as shown. The arm and flukes are preferably stamped from a single piece of steel strip, as is the shank 10.

The arm 21 has at its center a square aperture 23 in a web *or bottom* 23a of such size that the arm fits the shank snugly adjacent the crown end when the anchor is in either its working or stowing position. By virtue of the tapering cross-section of the shank, when the arm 21 is slid up the shank to a position near the relatively small free end thereof (as shown by the dotted outline in Figure 1), the arm is capable of 90° rotation in either direction about the axis of the shank to a position in the plane of the shank and stock, whereupon it may be slid back down the shank to the position shown in Figure 2. If desired, the ring 14 may be of such size that it will prevent the arm from sliding completely off the shank.

In the working position of the anchor, the stock 15 *engages* [receives the arm 21 by means of] a pair of apertures 24 provided in the sides 24a of the arm *21*. The relatively snug fit of the fluke arm against the shank prevents appreciable movement of the arm about the axis of the shank, and it will be apparent that the stock serves to prevent substantial rocking movement of the arm about the axis of the stock when the apertures in the arm engage it as described.

Figure 1:
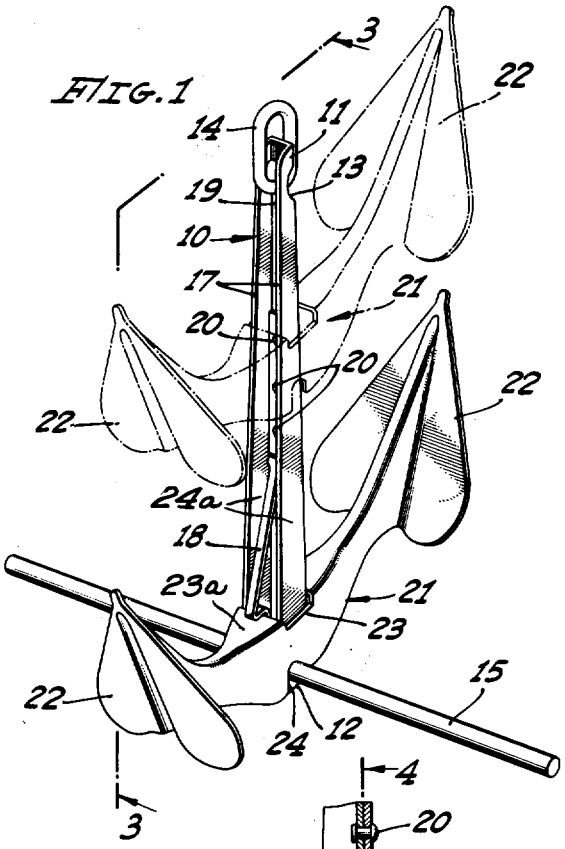
Figure 1 is a perspective view of the anchor in its usual or working position.
Figure 2:
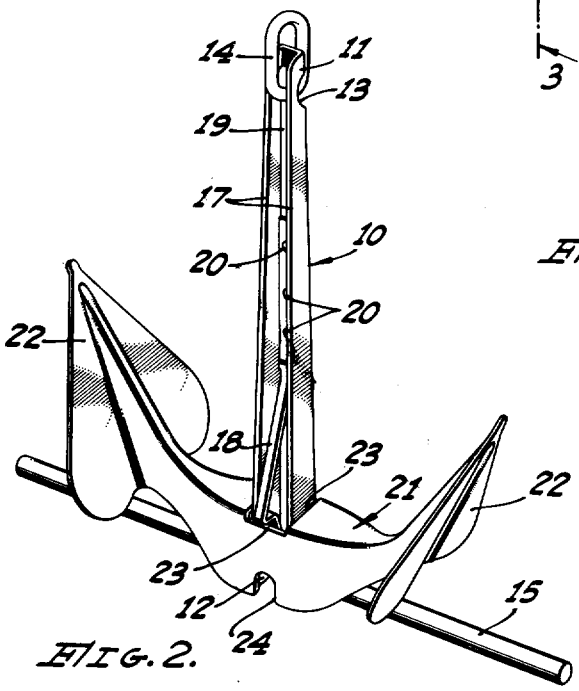
Figure 2 is a perspective view of the anchor showing it prepared for stowing.
Figure 3:
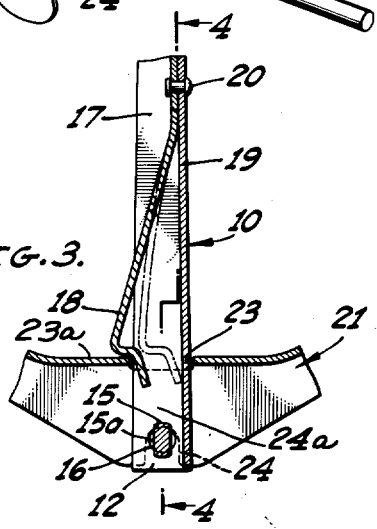
Figure 3 is a fragmental cross-sectional view taken in the plane 3—3 of Figure 1.

In order to change the anchor from the working position shown in Figure 1 to the stowing or handling position shown in Figure 2, it is only necessary to depress the latch 18, thereby releasing the fluke arm 21 from locked relationship with the shank and stock. The fluke arm may then be slid up the tapered shank to the point shown in dotted outline, whence it may be rotated 90° in either direction on the axis of the shank. After rotation the fluke arm is then slid back down the shank to the position shown in Figure 2, where the side wall portions of the arm cover the sides of the stock 15, at which point the latch 18 will spring out to retain the arm in that position against sliding movement. In order to return the fluke arm to its working position it is only necessary to reverse the above steps.

It will thus be seen that we have invented a novel and simple anchor construction which readily solves a vexing stowage problem for the owners of small watercraft, seaplanes, etc. It will, of course, be apparent that departures may be made from the design and construction illustrated and described without departing from the essence and scope of our invention as defined by the apppended claims.

We claim:

1. In an anchor adapted to be latched in stowing and working positions, the combination of: an elongated shank having a generally channeled cross-section along its longitudinal axis from a region adjacent the crown end to a region distal thereof, said shank being reduced in size at said distal region; a stock immovably secured adajcent the crown end of said shank; a fluke arm having an aperture in one face thereof, said aperture having a configuration for slidingly receiving said shank adjacent the crown end thereof in the stowing and working positions of the anchor, said fluke arm being rotatable between the stowing and working positions about said longitudinal shank axis adjacent said distal region; and latch means disposed in the channel of said shank adjacent the crown end thereof, said latch means comprising a detent portion normally urged outwardly from said channel and overlying a surface on said fluke arm when said anchor is in its stowing and working positions.

2. In an anchor adapted to be latched in stowing and working positions, the combination of: an elongated shank of generally channeled cross-section, said shank being reduced in size at a region distal of its crown end; a stock immovably secured adjacent the crown end of said shank; a fluke arm of generally channeled cross-section comprising a web and sides downwardly disposed from said web, said fluke arm web being apertured so as to slidably receive said shank therein, the channel formed by said fluke *arm* web and arm sides receiving said stock in overlying relationship when said anchor is latched in its stowing position, said arm sides being apertured so as to receive said stock when said anchor is latched in its working position, said fluke arm being rotatable between the stowing and working positions about said longitudinal shank axis adjacent said distal region; and latch means in the channel of said shank for releasably preventing sliding movement of said shank in said web aperture.

3. In an anchor adapted to assume a stowing position and a working position, the combination of: a shank; a stock immovably secured adjacent the crown end of said shank; and a fluke arm of generally channeled cross-section comprising a web and sides downwardly disposed from said web, said web being apertured so as to slidingly receive said shank therein, the channel formed by said web and sides receiving said stock in overlying relationship when said anchor is in its stowing position, said sides being apertured so as to receive said stock when said anchor is in its working position.

4. The invention of claim 3 further characterized by said fluke arm sides being apertured adjacent the lower edges thereof distal of said web aperture, the distance of said web aperture from said side apertures being such that substantial rocking movement of said fluke arm on said shank is prevented when said anchor is in its working position.

5. In combination in an anchor adapted to be latched in stowing and working positions, said anchor having a shank and a stock immovably secured adjacent the crown end of said shank; a fluke arm of generally channeled cross-section comprising a web and sides extending from said web, said web being apertured so as to slidingly receive said shank therein, the channel formed by said web and sides receiving said stock in overlying relationship when the anchor is latched in its stowing position, said sides being apertured so as to receive the stock when said anchor is latched in its working position, said fluke arm being rotatable about said shank at a region distal of said latching positions; and latch means on said shank, said means comprising a detent portion overlying a surface on said fluke arm for releasably securing said fluke arm against sliding movement away from said positions.

*6. An anchor formed for adjustment between stowing and working conditions comprising: a shank with a polygonal cross-sectional outline, said shank having cable-receiving and crown ends; stock and fluke-arm members carried by said shank, said members extending transversely of said shank and being disposed in angularly related planes in the working condition of said anchor, one of said members being rigidly fixed to the crown end of said shank, the other member having a polygonal hole to receive said shank for longitudinal adjustment, the relative sizes of said shank and the hole in said other member being such as to make the latter rotatably adjustable on said shank at the cable-receiving end thereof and secured against rotation on said shank at the crown end; means on said members forming an interlocking relationship therebetween in both stowing and working conditions of said anchor; and latch means at the crown end of said shank to engage said adjustable member and prevent undesired movement thereof longitudinally of said shank.*

*7. An anchor formed for adjustment between stowing and working conditions comprising: a shank with a cable-receiving and crown ends, said shank having a polygonal cross-sectional outline and being tapered from the crown to the cable-receiving end; stock and fluke-arm members carried by said shank, said members extending transversely of said shank and being disposed in angularly related planes when the anchor is in working condition, said members being in the same plane when the anchor is in stowing condition, one of said members being rigidly fixed to said shank, the other member having a polygonal hole to closely fit the crown end of said shank and prevent rotary movement of said member in both stowing and working conditions of said anchor, said other member being adjustable longitudinally of said shank and rotatable thereon when disposed adjacent the cable receiving end; means on said members forming an interlocking relationship therebetween in both stowing and working conditions of said anchor; and latch means adjacent the crown end of said shank for retaining said adjustable member against undesired movement from the crown toward the cable-receiving end.*

*8. An anchor formed for adjustment between stowing and working conditions comprising a shank having cable-receiving and crown ends; stock and fluke-arm members carried by said shank, said members extending transversely of said shank and being disposed in angularly related planes when in working positions, one of said members being rigidly fixed to the crown end of said shank, the other member and said shank being formed to interfit to preclude relative rotary movement when said other member is disposed at the crown end of said shank, said other member being rotatable on said shank when disposed adjacent the cable-receiving end thereof; means on said members forming an interlocking relationship therebetween in both stowing and working conditions of said anchor; and latch means adjacent the crown end of said shank for retaining said adjustable member against undesired movement longitudinally of said shank.*

References Cited in the file of this patent or the original patent

UNITED STATES PATENTS

| | | |
|---|---|---|
| Re. 21,841 | Northrop et al. | June 24, 1941 |
| 270,168 | Willis | Jan. 2, 1883 |
| 671,246 | Stuth | Apr. 2, 1901 |
| 703,739 | Rech | July 1, 1902 |
| 1,036,275 | Langford | Aug. 20, 1912 |
| 1,451,370 | Powell | Apr. 10, 1923 |
| 1,865,163 | Bedell | June 28, 1932 |
| 1,978,844 | McLeland | Oct. 30, 1934 |
| 2,208,663 | Conroy | July 23, 1940 |

FOREIGN PATENTS

| | | |
|---|---|---|
| 32,791 | Sweden | Jan. 24, 1911 |